US008271060B2

(12) United States Patent
Park et al.

(10) Patent No.: US 8,271,060 B2
(45) Date of Patent: Sep. 18, 2012

(54) ANTENNA DEVICE FOR PORTABLE WIRELESS TERMINAL

(75) Inventors: Joo-Hwan Park, Suwon-si (KR); Oh-Yong Kwon, Suwon-si (KR); You-sung Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 316 days.

(21) Appl. No.: 12/573,343

(22) Filed: Oct. 5, 2009

(65) Prior Publication Data

US 2010/0113112 A1 May 6, 2010

(30) Foreign Application Priority Data

Oct. 30, 2008 (KR) ........................ 10-2008-0107239

(51) Int. Cl.
*H04M 1/00* (2006.01)

(52) U.S. Cl. ..................... 455/575.7; 455/107; 455/129; 455/575.5; 343/702

(58) Field of Classification Search ............... 455/575.7, 455/575.5, 13.3, 19, 25, 63.4, 82, 83, 562.1, 455/107, 121, 129, 193.1, 279.1; 343/804, 343/825, 812, 810, 776, 751
See application file for complete search history.

(56) References Cited

U.S. PATENT DOCUMENTS

| | | | | |
|---|---|---|---|---|
| 7,453,405 | B2 * | 11/2008 | Nishikido et al. | 343/702 |
| 2003/0137459 | A1 * | 7/2003 | Kim et al. | 343/702 |
| 2006/0050007 | A1 * | 3/2006 | Min | 343/876 |
| 2006/0111162 | A1 * | 5/2006 | Seol et al. | 455/575.5 |
| 2007/0054693 | A1 * | 3/2007 | Su et al. | 455/550.1 |
| 2007/0232239 | A1 | 10/2007 | Der et al. | |
| 2008/0233880 | A1 * | 9/2008 | Rofougaran et al. | 455/42 |

FOREIGN PATENT DOCUMENTS

| | | | |
|---|---|---|---|
| EP | 1 662 605 | A1 | 5/2006 |
| EP | 1 903 633 | A | 3/2008 |
| EP | 1 903 633 | A1 | 3/2008 |
| JP | 7-273685 | A | 10/1995 |
| JP | 2000-209014 | A | 7/2000 |
| WO | 03/026342 | A2 | 3/2003 |
| WO | 2006/100913 | A1 | 9/2006 |

* cited by examiner

*Primary Examiner* — Kamran Afshar
*Assistant Examiner* — Khalid Shaheed
(74) *Attorney, Agent, or Firm* — Jefferson IP Law, LLP

(57) ABSTRACT

An antenna device for a portable wireless terminal is provided. The antenna device includes a main antenna for mobile communication for transmitting and receiving signal in a first frequency band, a Transmit (Tx) sub-antenna for transmitting signals in a second frequency band, a Receive (Rx) sub-antenna for receiving signals in a third frequency band, and a controller for selectively using one of the Tx sub-antenna and the Rx sub-antenna if the second frequency band overlaps with the third frequency band, and for providing control such that the Tx sub-antenna and the Rx sub-antenna are simultaneously used if the second frequency band does not overlap with the third frequency band. Accordingly, without increasing the volume of the portable wireless terminal, an antenna space can be ensured and radiation performance can be improved.

25 Claims, 8 Drawing Sheets

| IN-BAND | SPECIFIED AS | AT SOURCE P(W) | AT SOURCE P(dBm) | AT SOURCE P(dBuV) | AT 3m E(uV/m) | AT 3m E(dBuV/m) | AT 3m E(dBm/m) |
|---|---|---|---|---|---|---|---|
| FCC LIMIT | 250uV/m@3m | 19nW | −47dBm | 60dBuV | 250uV/m | 48dBuV/m | −59dBm/m |
| ETSI LIMIT | 50nW (−43dBm ERP) | 50nW | −43dBm | 64dBuV | 410uV/m | 52dBuV/m | −55dBm/m |

FIG.9
(CONVENTIONAL ART)

ANTENNA DEVICE FOR PORTABLE WIRELESS TERMINAL

PRIORITY

This application claims the benefit under 35 U.S.C. §119 (a) of a Korean patent application filed in the Korean Intellectual Property Office on Oct. 30, 2008 and assigned Serial No. 10-2008-0107239, the entire disclosure of which is hereby incorporated by reference.

BACKGROUND OF THE INVENTION

1. Field of the Invention

The present invention relates to a portable wireless terminal. More particularly, the present invention relates to an antenna device equipped in a portable wireless terminal.

2. Description of the Related Art

As the electronic communication industry develops, portable wireless terminals are becoming lighter, slimmer, smaller, and more multi-functional. For example, a speaker device capable of realizing melodies of various harmonies is installed, and a color display device with millions of pixels is implemented. Also, in addition to a call function, a portable wireless terminal now typically provides a music listening function through a Moving Picture Experts Group (MPEG) Audio Layer 3 (MP3) Player (MP3P). Furthermore, the portable wireless terminal provides not only various game contents using the display device but also a function of receiving a radio signal, a Digital Multimedia Broadcasting (DMB) signal, etc.

In general, a portable wireless terminal uses an antenna that transmits and receives signals. If it is desired to provide the portable wireless terminal with greater radio wave transmission/reception, the antenna is designed to be large so as to have high directivity. In such a case, the spacing distances between other parts within the portable wireless terminal decrease in order to maintain the lightness and smallness of the portable wireless terminal. Therefore, it is difficult to secure the space for the larger antenna and improve the transmission/reception performance of the terminal. In addition, a Transmit (Tx) output of a designed antenna should not be allowed to exceed a reference value permitted in each country.

For example, an antenna for transmitting and receiving a signal in a Frequency Modulation (FM) frequency band may be implemented with a single antenna (e.g., an earphone connected to an external connector). In this case, a problem arises in that a Transmit (Tx) output of the antenna for transmitting and receiving the signal in the FM frequency band exceeds a reference value permitted in each country. FIG. 8 is a graph illustrating an antenna performance of a conventional antenna transmitting and receiving singles in the FM spectrum. FIG. 9 is a table illustrating an FM Tx output regulation specified by the USA and Europe. In a case where an earphone antenna is used, the Tx output is 98 dB which exceeds an output regulation specified by each country as shown in FIG. 9. Accordingly, a need exists for an antenna device that increases the reliability of communication while not exceeding output regulations of each country.

SUMMARY OF THE INVENTION

An aspect of the present invention is to address at least the above-mentioned problems and/or disadvantages and to provide at least the advantages described below. Accordingly, an aspect of the present invention is to provide an antenna device having antennas for separately receiving and transmitting signals to increase reliability of communication.

Another aspect of the present invention is to provide an antenna device for a portable wireless terminal to improve radiation efficiency without increasing the volume of the portable wireless terminal.

Still another aspect of the present invention is to provide an antenna device for a portable wireless terminal to ensure an antenna space and to save costs by using a conductor equipped in the portable wireless terminal as an antenna radiator.

In accordance with an aspect of the present invention, an antenna device for a portable wireless terminal is provided. The device includes a main antenna for transmitting and receiving signals in a first frequency band, a Transmit (Tx) sub-antenna for transmitting signals in a second frequency band, a Receive (Rx) sub-antenna for receiving signals in a third frequency band, and a controller for selectively using one of the Tx sub-antenna and the Rx sub-antenna if the second frequency band overlaps with the third frequency band, and for providing control such that the Tx sub-antenna and the Rx sub-antenna are simultaneously used if the second frequency band does not overlap with the third frequency band.

In accordance with another aspect of the present invention, a portable wireless terminal having an antenna device for processing a signal of a corresponding frequency band is provided. The terminal includes a main antenna for mobile communication for transmitting and receiving signals in a first frequency band, a Tx sub-antenna for transmitting signals in a second frequency band, an Rx sub-antenna for receiving signals in a third frequency band, and a controller for selectively using one of the Tx sub-antenna and the Rx sub-antenna if the second frequency band overlaps with the third frequency band, and for providing control such that the Tx sub-antenna and the Rx sub-antenna are simultaneously used if the second frequency band does not overlap with the third frequency band.

In accordance with yet another aspect of the present invention, an antenna device for a portable wireless terminal is provided. The device includes a main antenna for transmitting and receiving a signal in a first frequency band, a Tx sub-antenna for transmitting a signal in a second frequency band, an Rx sub-antenna for receiving a signal in a third frequency band, and a controller for controlling the antennas of the first, second, and third frequency bands.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 9 is a table illustrating an FM Tx output regulation specified by the USA and Europe.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms “a”, “an”, and “the” include plural referents unless the context clearly dictates otherwise. Thus, for example, reference to “a component surface” includes reference to one or more of such surfaces.

By the term “substantially” it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to an antenna device for a portable wireless terminal, and more particularly, an antenna device to improve radiation performance without increasing the volume of the portable wireless terminal.

In addition, exemplary embodiments of the present invention relate to an antenna device to increase reliable communication by utilizing a case frame of a portable wireless terminal as a Transmit (Tx) antenna and by utilizing an earphone as a Receive (Rx) antenna.

Figure 1:
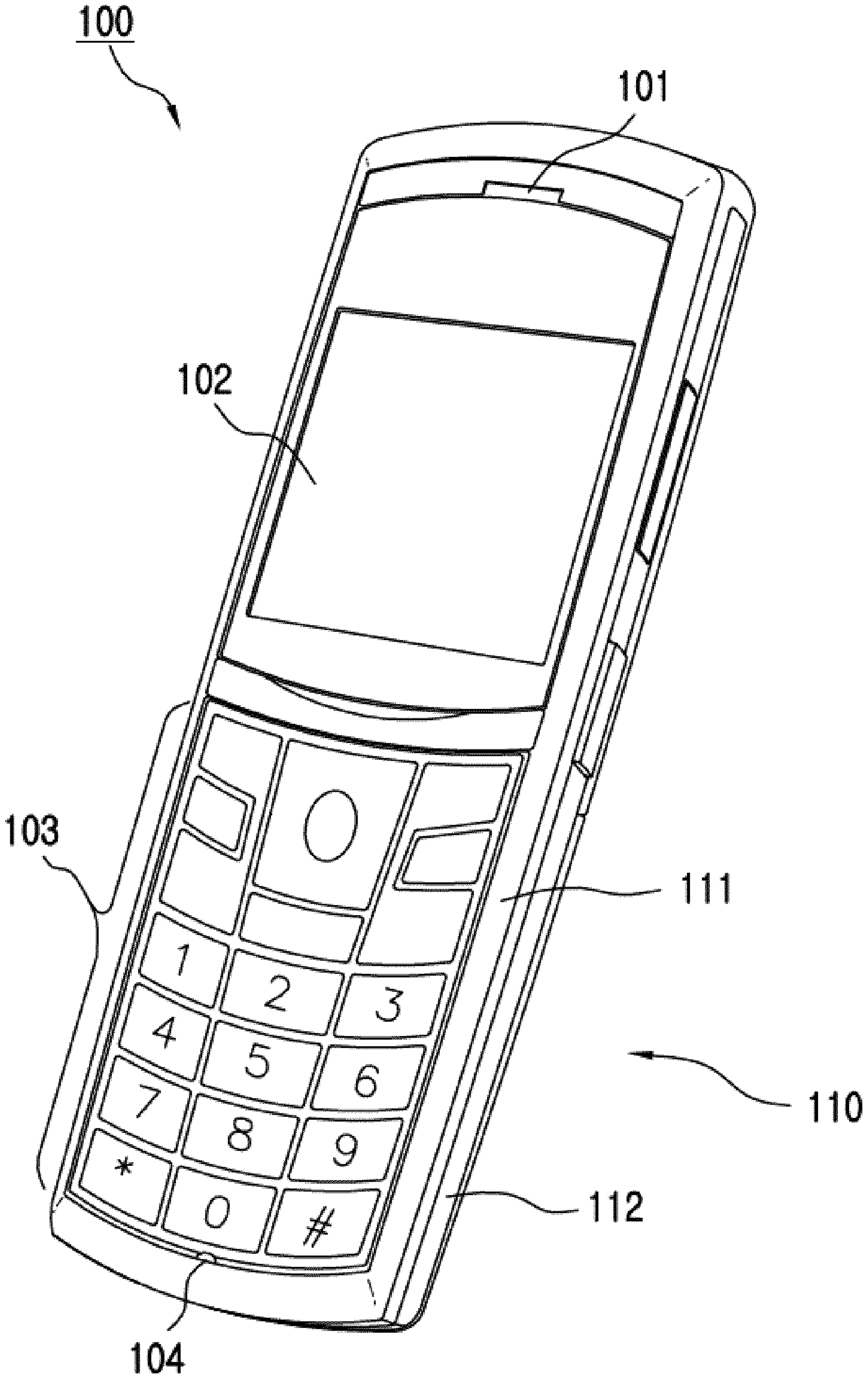
FIG. 1 is a perspective view of a portable wireless terminal according to an exemplary embodiment of the present invention.

Exemplary embodiments of the present invention will be described in terms of a bar-type portable wireless terminal as illustrated in FIG. 1. However, the type of terminal is not limited to the bar-type. In an exemplary implementation, a variety of portable wireless terminals may be used, such as, a folder type, a slide type, a flip type, a slide and rotation type, and the like.

FIG. 1 is a perspective view of a portable wireless terminal according to an exemplary embodiment of the present invention.

Referring to FIG. 1, a portable wireless terminal 100 includes a case frame 110 defining an outer surface thereof. The case frame 110 may be formed by injection molding. Moreover, the case frame 110 includes a top unit 111 and a bottom unit 112.

The case frame 110 includes a speaker 101 that outputs a voice signal and a display 102 disposed near the speaker 101 to output a video signal. The case frame 110 also includes a keypad assembly 103 that is a data input element and a microphone 104 disposed near the keypad assembly 103 to input a voice signal.

The display 102 may be a Liquid Crystal Display (LCD) having millions of pixels. If the LCD is provided with a touch screen, the display 102 may perform a function of a supplemental data input unit or as a data unit in place of the keypad assembly 103.

The portable wireless terminal 100 includes an antenna (not shown) for wireless communication. The antenna may include an internal antenna equipped in an inner space of the case frame 110 and an external antenna that protrudes to an external portion of the case frame 110.

The internal antenna may include a main internal antenna equipped in a main board (not shown) and capable of transmitting and receiving signals of at least one or more frequency bands. Further, according to an exemplary embodiment of the present invention, the portable wireless terminal 100 may use a radiator included in the case frame 110 as an internal antenna. Furthermore, the portable wireless terminal 100 may use an earphone connected to an external connector as an external antenna.

Preferably, the radiator included in the case frame 110 may be used instead of the main internal antenna for transmitting and receiving signals or may be used as an additional internal antenna. For example, the internal antenna utilizing the case frame 110 may improve radiation performance by transmitting and receiving signals in the same frequency band as the main internal antenna. Alternatively, the antenna utilizing the case frame 110 may handle a frequency band different from that of the main internal antenna. For example, the internal antenna utilizing the case frame 110 may transmit and receive a signal in any one of frequency bands such as Digital Multimedia Broadcasting (DMB), short-range wireless communication, and Frequency Modulation (FM).

More preferably, the portable wireless terminal 100 has antennas for separately transmitting and receiving signals. In doing so, the respective antennas separately transmit data, and several wireless Tx/Rx paths are established, thereby increasing communication reliability. For example, the radiator included in the case frame 110 may be used as an internal Tx antenna for transmitting a signal in the FM frequency band. Further, an earphone, a headset, a headphone, etc., (not shown) connected to an external connector of the portable wireless terminal may be used as an external Rx antenna for receiving the signal in the FM frequency band.

The main internal antenna and the internal Tx antenna utilizing the case frame 110 are electrically connected to the main board of the portable wireless terminal. The main board includes a power feeding portion electrically connected to a Radio Frequency (RF) connector and a ground portion having a specific-sized ground.

An exemplary embodiment of an internal Tx antenna utilizing the case frame 110 will be described below with reference to FIG. 3 and FIG. 4.

Figure 2:
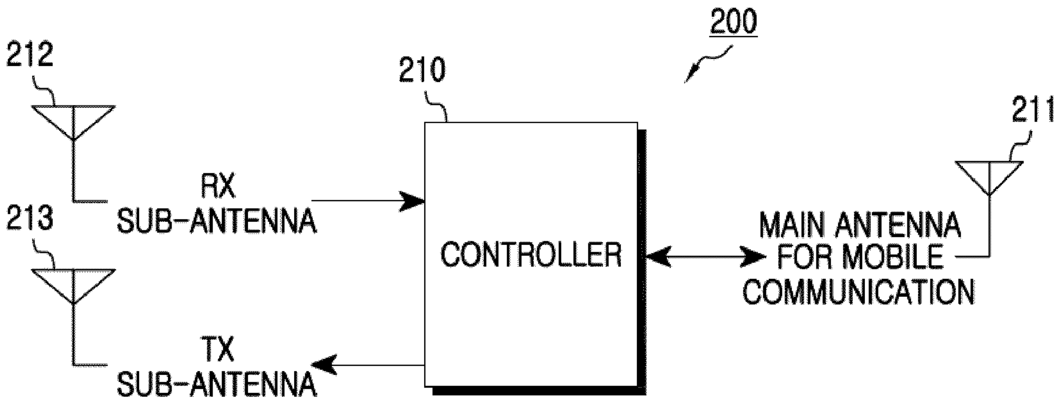
FIG. 2 is a block diagram of an antenna device for a portable wireless terminal according to an exemplary embodiment of the present invention.

FIG. 2 is a block diagram of an antenna device for a portable wireless terminal according to an exemplary embodiment of the present invention.

Referring to FIG. 2, an antenna device 200 for the portable wireless terminal includes a main antenna 211 for mobile communication for transmitting and receiving signals in at least one or more first frequency bands. Further, the antenna device 200 includes a Tx sub-antenna 213 for transmitting signals in a second frequency band, an Rx sub-antenna 212 for receiving signals in a third frequency band, and a controller 210 for controlling overall communication. If the second frequency band overlaps with the third frequency band, the portable wireless terminal can selectively use the Rx sub-antenna 212 and the Tx sub-antenna 213 under the control of the controller 210. If the second frequency band does not overlap with the third frequency band, the portable wireless terminal can use both the Tx sub-antenna 213 and the Rx sub-antenna 212. The controller 210 provides control such that the main antenna 211 is continuously used for calling and call waiting of the portable wireless terminal. As described above, the main antenna 211 may be an internal antenna equipped in a main board (not shown) and capable of transmitting and receiving a signal of at least one or more frequency bands. Further, the Rx sub-antenna 212 may use an earphone, and the Tx sub-antenna 213 may use the case frame 110. A more detailed structure of the Tx sub-antenna 213 will be described below with reference to FIG. 3 and FIG. 4.

Figure 3:
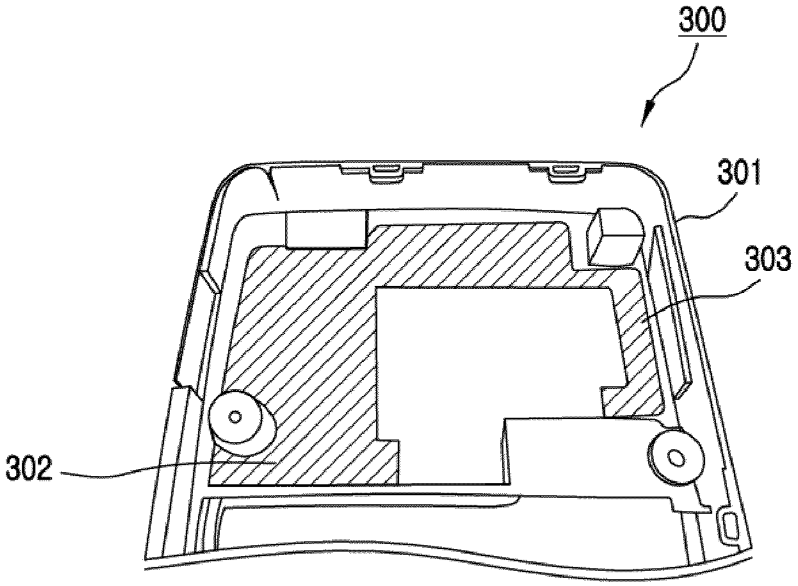
FIG. 3 is a plan view of an internal Transmit (Tx) antenna using a case frame of a portable wireless terminal according to an exemplary embodiment of the present invention.

FIG. 3 is a plan view of an internal Tx antenna using a case frame of a portable wireless terminal according to an exemplary embodiment of the present invention.

Referring to FIG. 3, an internal Tx antenna 300 includes an antenna radiator 303 for processing signals. More particularly, according to an exemplary embodiment of the present invention, a portion or entirety of an inner surface of a case frame 301 constitutes the antenna radiator 303.

The case frame 301 may be a battery cover for protecting a cell-type battery packet used as a power supply element of the portable wireless terminal Further, the antenna radiator 303 may be any one or at least two combinations of a conductive spray that is coated in a specific pattern in the inner surface of the case frame 301, a metallic plate formed and attached in a specific pattern, and a flexible printed circuit.

The internal Tx antenna 300 may include a ground 302 applied to the case frame 301 to improve ElectroMagnetic Compatibility (EMC) and radiation performance.

Therefore, the internal Tx antenna 300 utilizing the case frame 301 is electrically connected to a main board (not shown) of the portable wireless terminal by means of a connection element. The internal Tx antenna 300 may operate as a monopole-type antenna by being connected to a power feeding portion connected to an RF connector of the main board. Further, the internal Tx antenna 300 may operate as a dipole-type antenna by being connected to a ground portion and the power feeding portion of the main board. For example, the internal Tx antenna 300 may be a Planar Inverted F Antenna (PIFA)-type antenna. The connection element will be described below in the same context with reference to FIG. 4.

Figure 4:
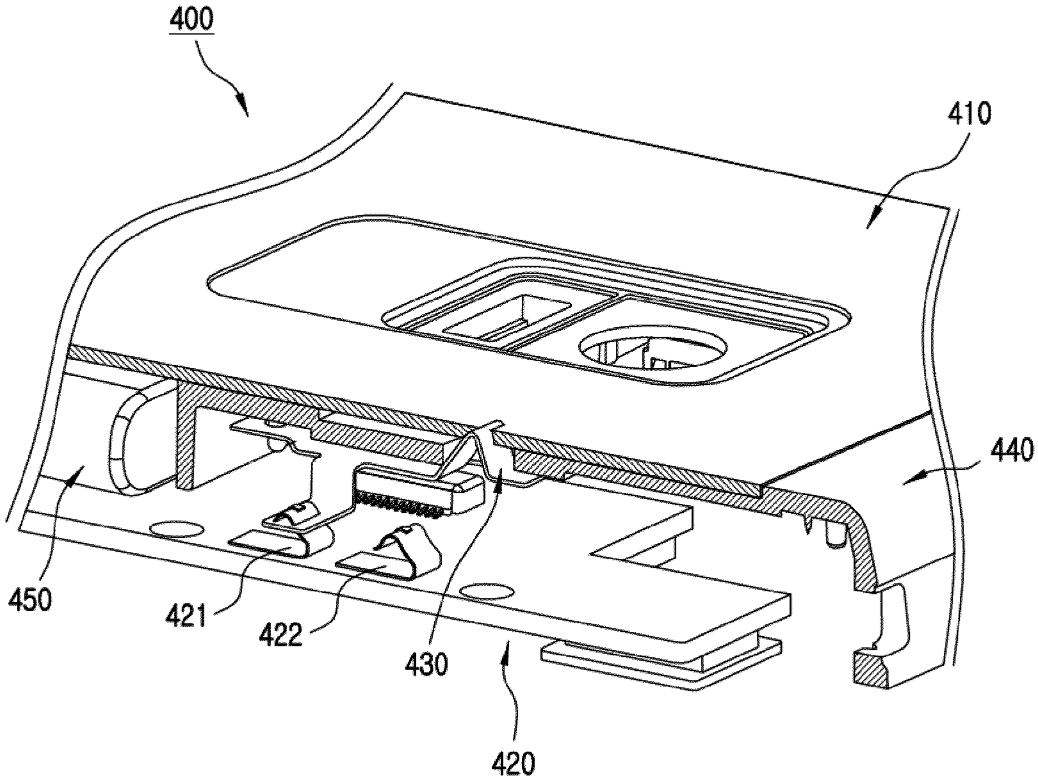
FIG. 4 is a partial cross-sectional perspective view of an internal Tx antenna device according to an exemplary embodiment of the present invention.

FIG. 4 is a partial cross-sectional perspective view of an internal Tx antenna device according to an exemplary embodiment of the present invention.

Referring to FIG. 4, an internal Tx antenna device 400 includes a case frame 410 made of a radiative metallic material and a main board 420 electrically connected to the case frame 410. The internal Tx antenna device 400 further includes an electrical connection element 430 for electrically connecting the case frame 410 and the main board 420.

The internal Tx antenna device 400 may further include an additional bolster plate 440 for bolstering the main board 420, the case frame 410, and the electrical connection element 430.

According to the illustrated exemplary embodiment of the present invention, the metallic case frame 410 takes a role as an antenna radiator for transmitting a signal of a specific frequency band. More particularly, the case frame 410 may be a metallic battery cover for protecting a cell-type battery pack 450 used as a power supply element of the portable wireless terminal.

The main board 420 includes a power feeding portion 421 electrically connected to an RF connector and a ground portion 422.

One end of the electrical connection element 430 is connected to the main board 420 including the power feeding portion 421 and the ground portion 422. The other end of the electrical connection element 430 is connected to the case frame 410 made of the metallic material.

Therefore, the internal Tx antenna device 400 may operate as a monopole-type antenna device in which the case frame 410 is connected to the power feeding portion 421 of the main board 420 by means of the electric connection element 430. In addition, the internal Tx antenna device 400 may operate as a dipole-type internal Tx antenna device in which the case frame 410 is connected to the power feeding portion 421 and the ground portion 422 of the main board 420.

The electric connection element 430 may use not only a bent-shaped plate but also a session cable, a flexible printed circuit, a metallic plate spring, etc.

It has been described above with reference to FIG. 2 that an exemplary antenna device of the present invention selectively uses one of a Tx sub-antenna and an Rx sub-antenna when the two antennas process signals of overlapping frequency bands. It has also been described above that an exemplary antenna device of the present invention simultaneously uses the Tx sub-antenna and the Rx sub-antenna when the two antennas process signals of non-overlapping frequency bands. In addition, an exemplary structure of a Tx sub-antenna has been described above by taking an example of the internal Tx antenna 300 of FIG. 3 and the internal Tx antenna device 400 of FIG. 4.

More particularly, the internal Tx antenna device (or internal Tx antenna) of FIG. 3 and FIG. 4 according to an exemplary embodiment of the present invention may transmit signals in a frequency band (i.e., 70 MHz to 110 MHz) allocated to an FM radio broadcast. Therefore, if the Rx sub-antenna receives signals in an FM frequency band overlapping with that of the internal Tx antenna, a portable wireless terminal according to an exemplary embodiment of the present invention may selectively use one of the internal Tx antenna and the Rx sub-antenna. Further, if the Rx sub-antenna receives signals of either short-range wireless communication or DMB that are different from that of the internal Tx antenna, the internal Tx antenna and the internal Rx antenna may be simultaneously used.

Figure 5:
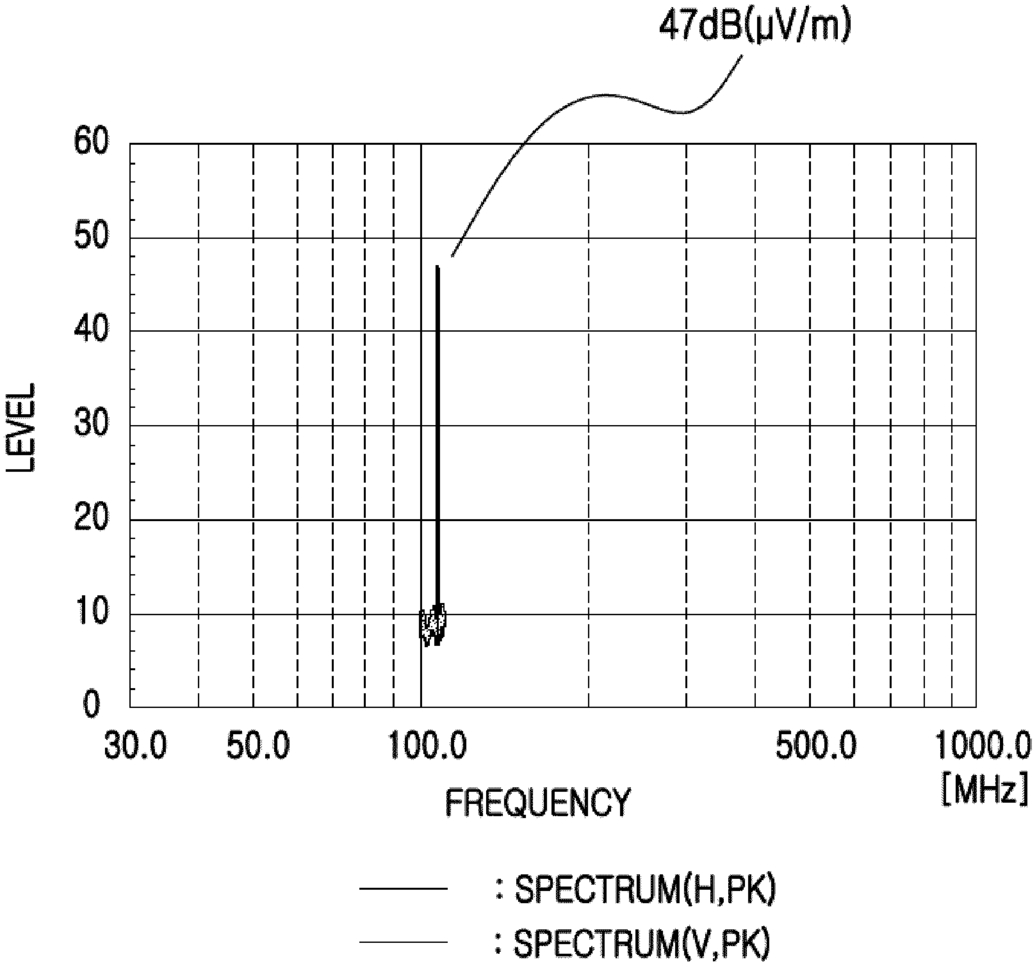
FIG.5 (CONVENTIONAL ART)
FIG. 5 is a graph illustrating an antenna performance (i.e., Tx output) of a conventional Bluetooth device transmitting signals in a Frequency Modulation (FM) frequency band of 88 MHz to 108 MHz.
Figure 6:
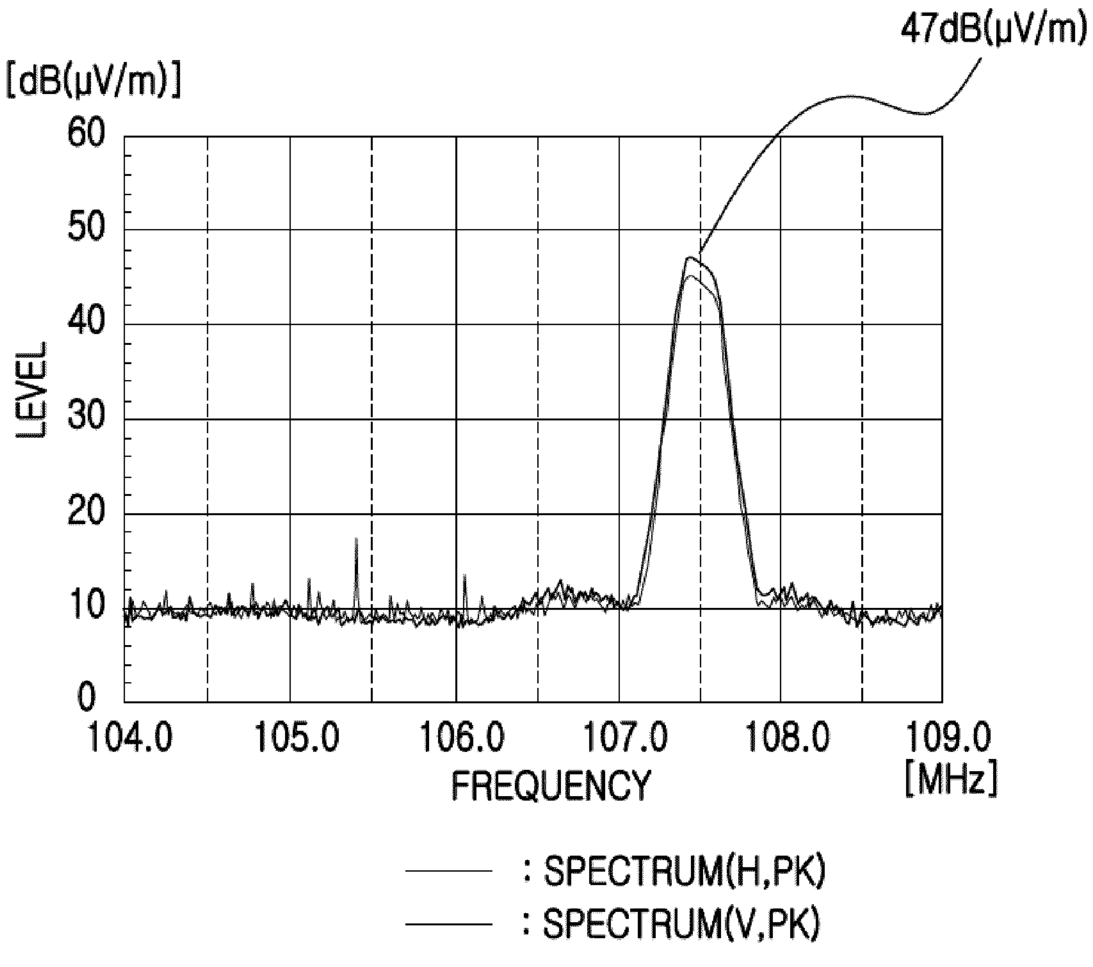
FIG. 6 is a graph illustrating an antenna performance (i.e., Tx output) of an internal Tx antenna device, transmitting a signal in an FM frequency band, shown in FIG. 3 according to an exemplary embodiment of the present invention.

FIG. 5 is a graph illustrating an antenna performance (i.e., Tx output) of a conventional Bluetooth device transmitting signals in a Frequency Modulation (FM) frequency band of 88 MHz to 108 MHz. In addition, FIG. 6 is a graph illustrating an antenna performance (i.e., Tx output) of an internal Tx antenna device, transmitting a signal in an FM frequency band, shown in FIG. 3 according to an exemplary embodiment of the present invention. Also, FIG. 7 is a graph illustrating an antenna performance (i.e., Tx output) of an internal Tx antenna device, transmitting signals in an FM frequency band, shown in FIG. 4 according to an exemplary embodiment of the present invention.

Figure 7:
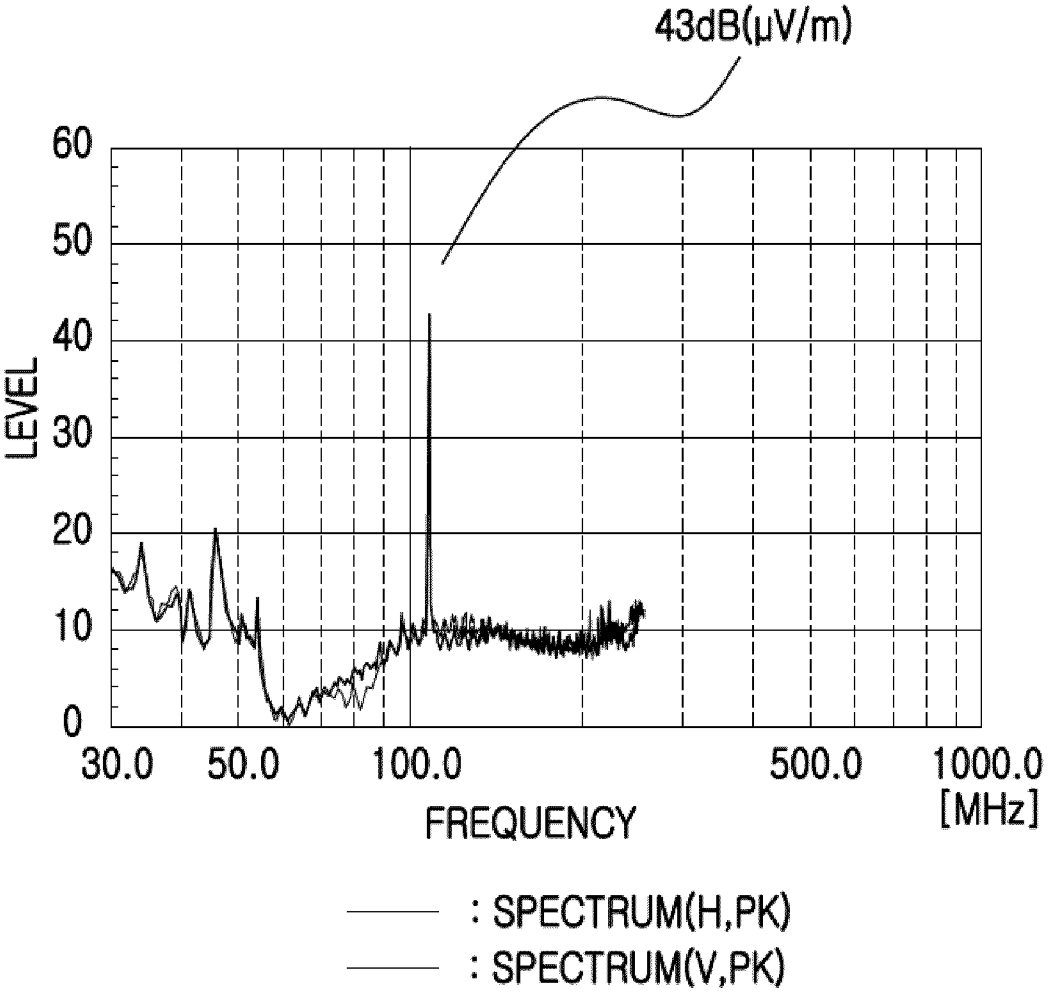
FIG. 7 is a graph illustrating an antenna performance (i.e., Tx output) of an internal Tx antenna device, transmitting signals in an FM frequency band, shown in FIG. 4 according to an exemplary embodiment of the present invention.
Figure 8:
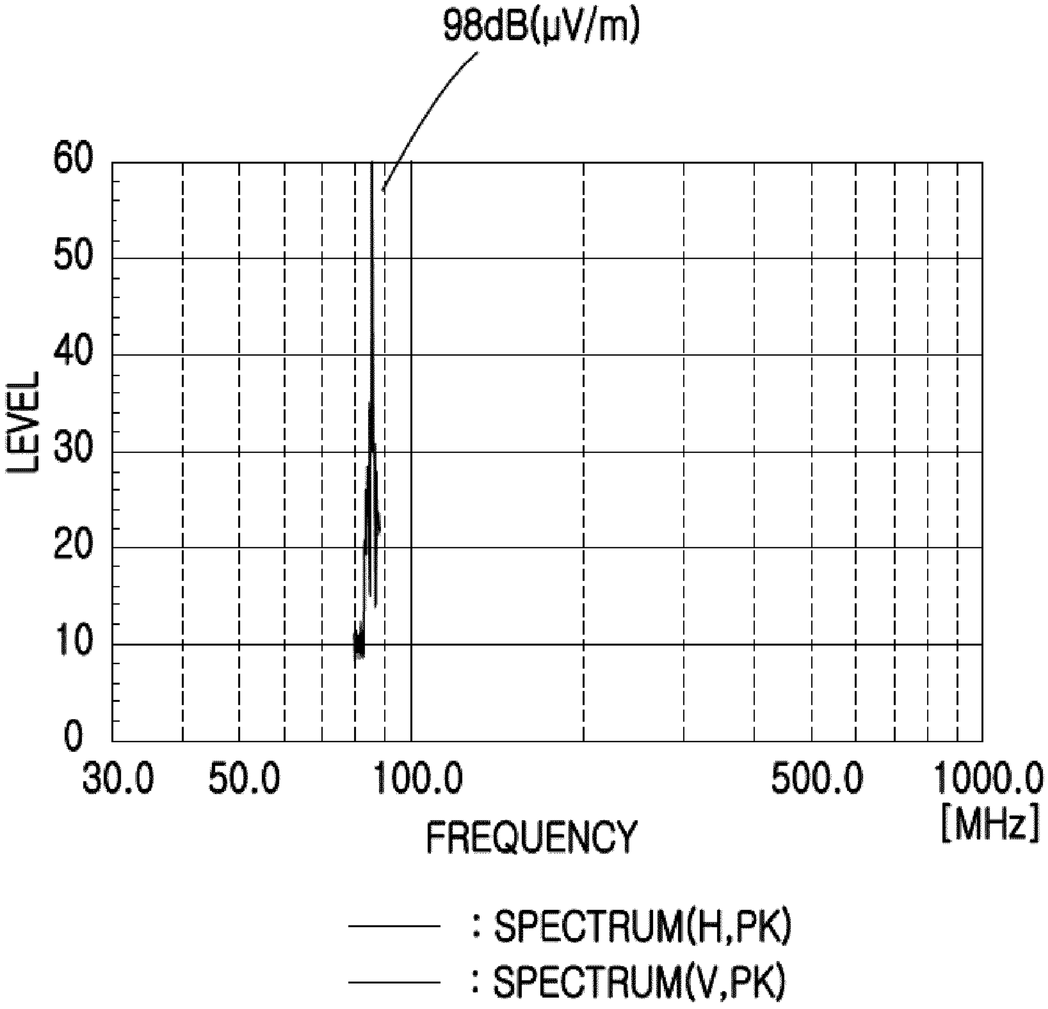
FIG.8 (CONVENTIONAL ART)
FIG. 8 is a graph illustrating an antenna performance of a conventional antenna transmitting and receiving singles in the FM spectrum.

Referring to FIG. 5 to FIG. 7, an internal Tx antenna device utilizing the aforementioned case frame according to an exemplary embodiment of the present invention has a radiation performance level similar to that of the conventional Bluetooth device. Therefore, the internal Tx antenna device utilizing the case frame can improve antenna radiation performance by ensuring an antenna space without increasing the volume of the portable wireless terminal.

According to exemplary embodiments of the present invention, a radiator equipped in a case frame of a portable wireless terminal for transmitting a signal of a corresponding frequency band and an earphone for receiving the signal of the frequency band are used to contribute to reliable communication.

Further, by using an internal Tx antenna device having an antenna radiator in the case frame of the portable wireless terminal, an antenna space can be ensured and radio performance can be improved without increasing the volume of the portable wireless terminal.

More particularly, an antenna device according to an exemplary embodiment of the present invention has separate Tx antennas and Rx antennas, and thus can be designed according to a Tx output regulation specified by each country.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An antenna device for a portable wireless terminal, the device comprising:

- a main antenna for transmitting and receiving a signal in a first frequency band;
- a Transmit (Tx) sub-antenna for transmitting a signal in a second frequency band;
- a Receive (Rx) sub-antenna for receiving a signal in a third frequency band; and
- a controller for selectively using one of the Tx sub-antenna and the Rx sub-antenna if the second frequency band overlaps with the third frequency band, and for providing control such that the Tx sub-antenna and the Rx sub-antenna are simultaneously used if the second frequency band does not overlap with the third frequency band,
- wherein the controller provides control such that the main antenna for mobile communication is continuously used for calling and call waiting, and
- wherein the Tx sub-antenna comprises:
  - a main board having a power feeding portion electrically connected to an RF connector;
  - a bolster plate for bolstering the main board;
  - an antenna radiator, included in a case frame comprising an outer surface of the terminal, for transmitting signals; and
  - an electrical connection element for electrically connecting the antenna radiator and the power feeding portion.

2. The device of claim 1, wherein the main antenna is equipped in a main board having a power feeding portion electrically connected to a Radio Frequency (RF) connector.

3. The device of claim 1, wherein the Rx sub-antenna comprises at least one of an earphone, a headset, and a headphone connected to the portable wireless terminal.

4. The device of claim 1, wherein the antenna radiator comprises a case frame made of a metallic material and is electrically connected to the power feeding portion.

5. The device of claim 4, wherein the case frame comprises a metallic battery cover for protecting a cell-type battery pack used as a power supply element of the terminal.

6. The device of claim 1, wherein the case frame comprises a metallic battery cover for protecting a cell-type battery packet used as a power supply element of the terminal, and the antenna radiator is applied to one of a portion and an entirety of an inner surface of the metallic battery cover.

7. The device of claim 1, wherein the antenna radiator comprises at least one of an ElectroMagnetic Interference (EMI) shielding spray that is coated in a specific pattern in an inner surface of the case frame, a metallic plate formed and attached in a specific pattern, and a flexible printed circuit.

8. The device of claim 6, wherein the antenna radiator comprises at least one of an EMI shielding spray that is coated in a specific pattern in an inner surface of the battery cover, a metallic plate formed and attached in a specific pattern, and a flexible printed circuit.

9. The device of claim 1, wherein one end of the electrical connection element is connected with the power feeding portion and the other end thereof comprises at least one of a session cable, a flexible printed circuit, and a metallic plate spring connected to the radiator.

10. The device of claim 1, wherein the antenna radiator transmits signals for short-range wireless communication.

11. The device of claim 10, wherein the antenna radiator transmits signals in a Frequency Modulation (FM) frequency band.

12. The device of claim 10, wherein the antenna radiator transmits signals in a frequency band of 70 MHz to 110 MHz.

13. A portable wireless terminal having a device for processing a signal of a corresponding frequency band, the terminal comprising:

- a main antenna transmitting and receiving a signal in a first frequency band;
- a Transmit (Tx) sub-antenna for transmitting a signal in a second frequency band;
- a Receive (Rx) sub-antenna for receiving signals in a third frequency band; and
- a controller for selectively using one of the Tx sub-antenna and the Rx sub-antenna if the second frequency band overlaps with the third frequency band, and for providing control such that the Tx sub-antenna and the Rx sub-antenna are simultaneously used if the second frequency band does not overlap with the third frequency band,
- wherein the controller provides control such that the main antenna for mobile communication is continuously used for calling and call waiting, and
- wherein the Tx sub-antenna comprises:
  - a main board having a power feeding portion electrically connected to an RF connector;
  - a bolster plate for bolstering the main board;

an antenna radiator, included in a case frame comprising an outer surface of the terminal, for transmitting signals; and an electrical connection element for electrically connecting the antenna radiator and the power feeding portion.

14. The terminal of claim 13, wherein the main antenna is equipped in a main board having a power feeding portion electrically connected to a Radio Frequency (RF) connector.

15. The terminal of claim 13, wherein the Rx sub-antenna comprises at least one of an earphone, a headset, and a headphone connected to the portable wireless terminal.

16. The terminal of claim 13, wherein the antenna radiator comprises a case frame made of a metallic material and is electrically connected to the power feeding portion.

17. The terminal of claim 16, wherein the case frame comprises a metallic battery cover for protecting a cell-type battery pack used as a power supply element of the terminal.

18. The terminal of claim 13, wherein the case frame comprises a metallic battery cover for protecting a cell-type battery packet used as a power supply element of the terminal, and the antenna radiator is applied to one of a portion and an entirety of an inner surface of the metallic battery cover.

19. The terminal of claim 13, wherein the antenna radiator comprises at least one of an ElectroMagnetic Interference (EMI) shielding spray that is coated in a specific pattern in an inner surface of the case frame, a metallic plate formed and attached in a specific pattern, and a flexible printed circuit.

20. The terminal of claim 18, wherein the antenna radiator comprises at least one of an EMI shielding spray that is coated in a specific pattern in an inner surface of the battery cover, a metallic plate formed and attached in a specific pattern, and a flexible printed circuit.

21. The terminal of claim 13, wherein one end of the electrical connection element is connected with the power feeding portion and the other end thereof comprises at least one of a session cable, a flexible printed circuit, and a metallic plate spring connected to the radiator.

22. The terminal of claim 13, wherein the antenna radiator transmits signals for short-range wireless communication.

23. The terminal of claim 22, wherein the antenna radiator processes signals in a Frequency Modulation (FM) frequency band.

24. The terminal of claim 22, wherein the antenna radiator transmits signals in a frequency band of 70 MHz to 110 MHz.

25. An antenna device for a portable wireless terminal, the device comprising:

a main antenna for transmitting and receiving signals in a first frequency band;

a Transmit (Tx) sub-antenna for transmitting signals in a second frequency band;

a Receive (Rx) sub-antenna for receiving signals in a third frequency band; and a controller for controlling the antennas of the first frequency band, the second frequency band, and the third frequency band, wherein the controller selectively uses one of the Tx sub-antenna and the Rx sub-antenna if the second frequency band overlaps with the third frequency band, and simultaneously uses the Tx sub-antenna and the Rx sub-antenna if the second frequency band does not overlap with the third frequency band, wherein the controller provides control such that the main antenna for mobile communication is continuously used for calling and call waiting, and wherein the Tx sub-antenna comprises:

a main board having a power feeding portion electrically connected to an RF connector, a bolster plate for bolstering the main board;

an antenna radiator, included in a case frame comprising an outer surface of the terminal, for transmitting signals; and an electrical connection element for electrically connecting the antenna radiator and the power feeding portion.

* * * * *